United States Patent [19]

Takehara

[11] Patent Number: 4,647,988
[45] Date of Patent: Mar. 3, 1987

[54] MAGNETIC WRITE CIRCUIT

[75] Inventor: Shigeru Takehara, Isobe Chiba, Japan

[73] Assignee: Motorola, Inc., Schaumburg, Ill.

[21] Appl. No.: 707,715

[22] Filed: Mar. 4, 1985

[51] Int. Cl.$^4$ ............................................. G11B 5/09
[52] U.S. Cl. .................................................. 360/46
[58] Field of Search ............................ 360/46, 68, 45

[56] References Cited

U.S. PATENT DOCUMENTS 4,249,219  2/1981  Aoi et al. ............................. 360/46

Primary Examiner—Vincent P. Canney
Attorney, Agent, or Firm—William E. Koch

[57] ABSTRACT

A magnetic write circuit is provided for converting digital input signals onto magnetic media such as disks. The circuit requires a low supply voltage (i.e., only 5 volts) while providing a relatively high voltage margin from the supply voltage for write operations. A flip-flop is coupled to receive the digital input signal and provides first and second complimentary output signals for driving a pair of differentially connected transistors. A coil is coupled between collectors of the transistors and has a midpoint coupled to a voltage source by a diode. A monostable multivibrator is coupled to receive the digital input signal and provides a pulse to a buffer driver. A capacitor is coupled between the buffer driver and the midpoint of the coil for providing an increased voltage to the coil.

8 Claims, 5 Drawing Figures

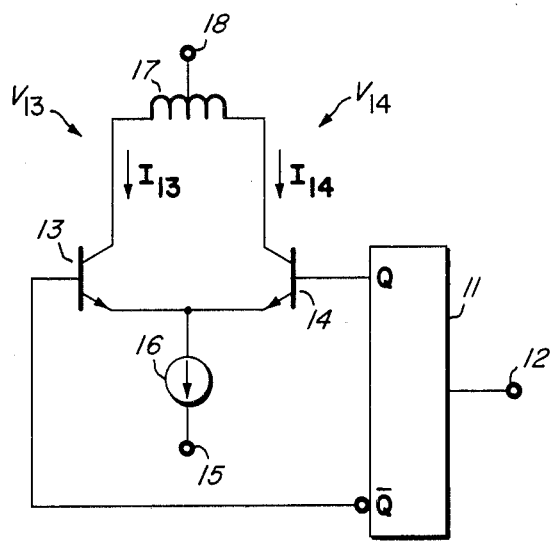
FIG. 1
FIG. 2
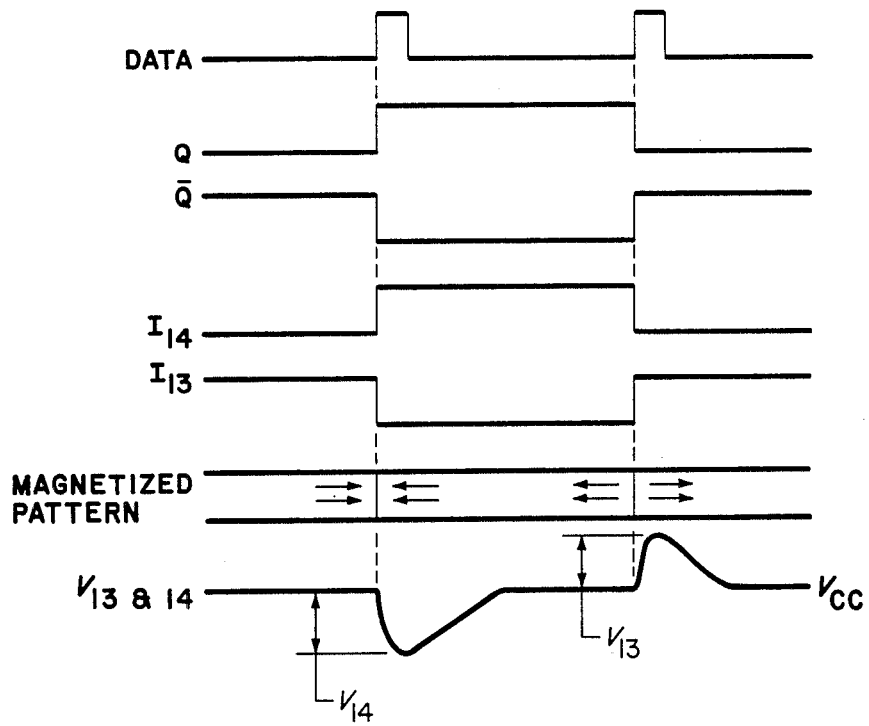

MAGNETIC WRITE CIRCUIT

BACKGROUND OF THE INVENTION

1. Field of the Invention

This invention relates in general to a magnetic write circuit and, more specifically, to a circuit for writing digital input signals onto magnetic media such as disks.

2. Background Art

In contemporary data processing systems, data is stored on magnetic tape or magnetic discs for retrieval and use at a later time. The data is recorded on one or more tracks of the magnetic medium in the form of a magnetic pattern, i.e., a sequence of ones and zeros, which corresponds to a digital input signal pattern. Conventional circuitry for writing a digital input signal pattern onto a magnetic media comprises an induction coil coupled to a circuit responsive to the digital input signal. A typical magnetic write circuit is shown in FIG. 1 and comprises flip-flop 11 coupled to receive the digital input signal on terminal 12. Differentially connected NPN transistors 13 and 14 have their emitters coupled to supply voltage terminal 15 by current source 16. The base of transistor 14 is connected to output Q of flip-flop 11, and the base of transistor 13 is connected to output $\bar{Q}$ of flip-flop 11. Outputs Q and $\bar{Q}$ are logically complementary signals of one another. Induction coil 17 is coupled between the collectors of transistors 13 and 14, and is coupled to voltage supply terminal 18 in a manner known to those skilled in the art. Coil 17 is part of a magnetic head (not shown) in which a magnetic disk (not shown) may be rotated. Digital input data is applied on terminal 12 to flip-flop 11, which alternately switches transistors 13 and 14 on and off. Collector currents $I_{13}$ and $I_{14}$ of transistors 13 and 14, respectively, flow through coil 17, thereby generating magnetic flux within the magnetic head for "writing" on the disk. Magnetic particles on the disk correspond to the digital input signal.

FIG. 2 illustrates waveforms associated with the previously known circuit of FIG. 1. At every pulse of the digital input data, Q and $\bar{Q}$ change state. When Q goes high, current $I_{14}$ flows, and when $\bar{Q}$ goes high, current $I_{13}$ flows. This results in the magnetized pattern and voltage $V_{14}$ at the collector of transistor 14 as shown. The induced collector voltage $V_{14}$ is generated in the coil when current flow into the coil changes. This induced voltage depends on inductance of the coil, amount of current change, speed of current change, stray capacitance and other factors.

When this induced voltage is restricted, i.e., $V_{14} \cdot V_{CC}$ for a 5 volt supply voltage $V_{CC}$, $V_{14}$ cannot reach a sufficient amplitude because transistors 13 and 14 saturate, and the collector current will be decreased. This reduced voltage $V_{14}$ delays current flow. This problem is illustrated in FIG. 3. Current $I_{14}$ is seen to lag current $I_{13}$, resulting in a gap in the magnetic pattern.

The induced voltage swing in present devices is approximately four to seven volts while typical supply voltage $V_{CC}$ is twelve volts for five inch floppy disk drives and twenty four volts for eight inch floppy disk drives. It is desirable to achieve a five volt single supply floppy disk driver or a battery-operated floppy disk driver, wherein both have sufficient voltage margin at the coil to prevent transistors 13 and 14 from saturating. In both cases, low voltage write operation is essential.

Thus, a magnetic write cirduit for low voltage disk drives is needed.

SUMMARY OF THE INVENTION

Accordingly, it is an object of the present invention to provide an improved magnetic write circuit.

Another object of the present invention is to provide a magnetic write circuit having improved performance at low voltage operation.

In carrying out the above and other objects of the invention in one form, there is provided a flip-flop coupled to receive a digital input signal and provides first and second complimentary output signals for driving a pair of differentially connected transistors. A coil is coupled between collectors of the transistors and has a midpoint coupled to a voltage source by a diode. A monostable multivibrator is coupled to receive the digital input signal and provides a pulse to a buffer driver. A capacitor is coupled between the buffer driver and the midpoint of the coil for providing an increased voltage to the coil.

The above and other objects, features, and advantages of the present invention will be better understood from the following detailed description taken in conjunction with the accompanying drawings.

BRIEF DESCRIPTION OF THE DRAWINGS

FIG. 1 is a schematic of a prior art write circuit.

FIG. 2 illustrates waveforms associated with the prior art write circuit.

DETAILED DESCRIPTION OF THE INVENTION

Figure 3:
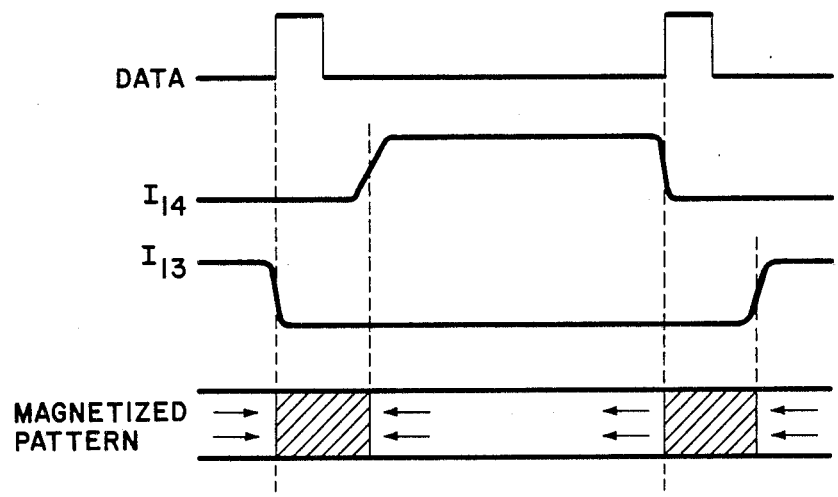
FIG. 3 illustrates waveforms associated with the prior art write circuit when operated at low voltages.
Figure 4:
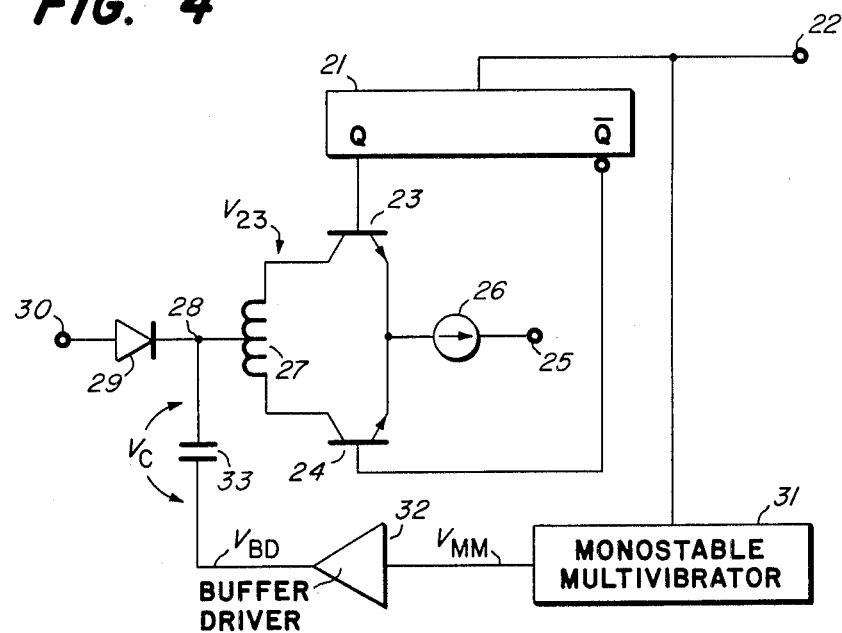
FIG. 4 is a schematic of the preferred embodiment.

Referring to FIG. 4, flip-flop 21 is connected to input terminal 22 for receiving digital input data. Differentially connected NPN transistors 23 and 24 have their emitters coupled to supply terminal 25 by current source 26 and their bases connected to Q output and $\bar{Q}$ output, respectively, of flip-flop 21. Coil 27 is coupled between the collectors of transistors 23 and 24. A mid point of coil 27 is connected to node 28 and the cathode of diode 29. The anode of diode 29 is connected to supply voltage terminal 30.

Monostable multivibrator 31 is coupled between input terminal 22 and buffer driver 32, and capacitor 33 is coupled between buffer driver 32 and node 28. Monostable multivibrator 31, buffer driver 32 and capacitor 33 comprise what is commonly referred to in the art as a charge pump for supplying additional current to coil 27. Monostable multivibrator 31 generates a pulse of sufficient width to insure that current is conducted through coil 27 and buffer driver 32 generates a pulse having voltage $V_{BD}$ with sufficient current capability for supplying coil 27.

Figure 5:
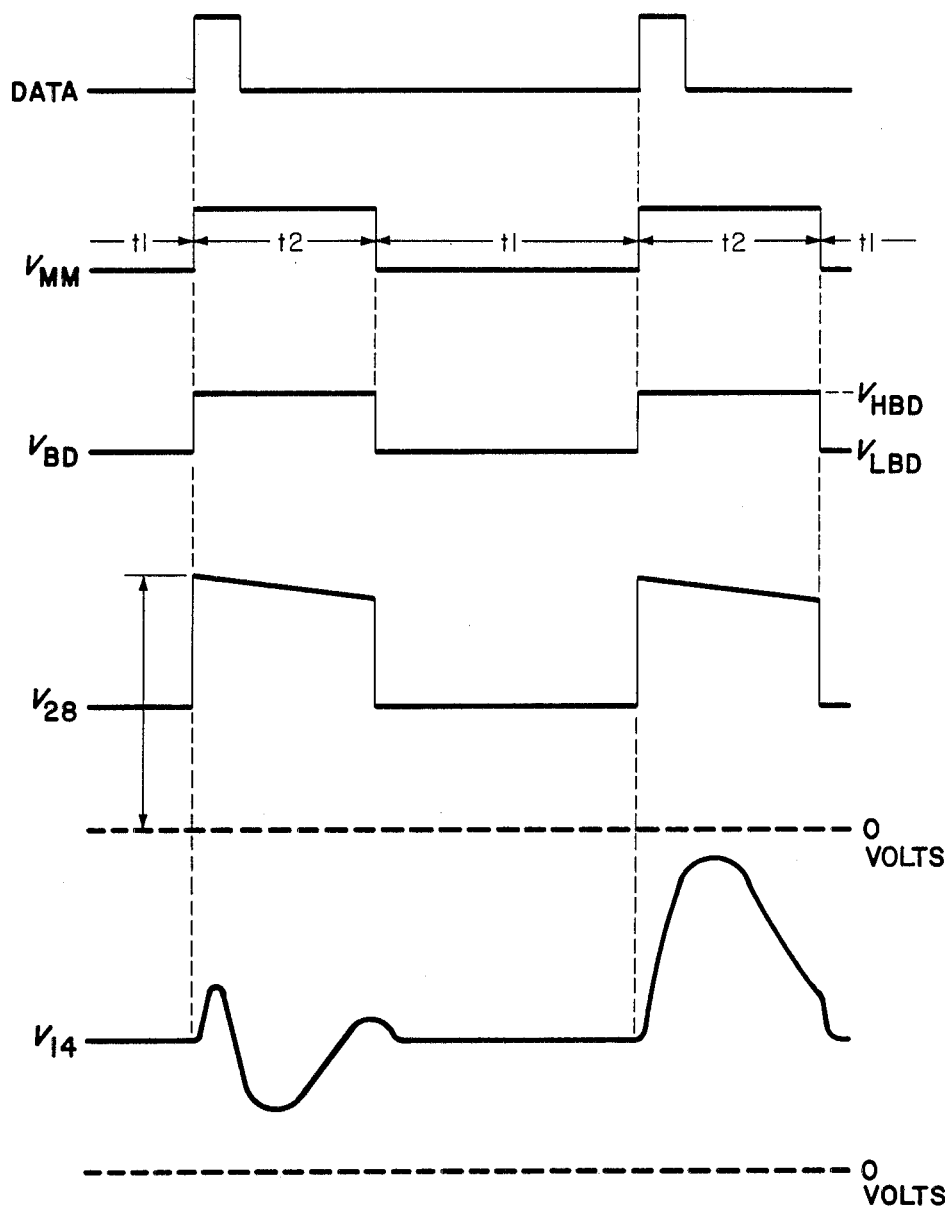
FIG. 5 illustrates waveforms associated with the preferred embodiment.

FIG. 5 is a timing diagram comprising waveforms for the inventive circuit of FIG. 4. Referring to both FIGS. 4 and 5, during $t_1$, digital input data, the output pulse ($V_{MM}$) from monostable multivibrator 31, and therefore the voltage $V_{BD}$ at the output of buffer driver 32 are low, and capacitor 33 is charged by the current from supply voltage terminal 30 through diode 29. Current also is supplied during time $t_1$ from supply voltage terminal 30 through diode 29 to coil 27. When capacitor 33 is sufficiently charged, $$V_{28} = V_{CC} - V_D - V_{LBD},$$

where
$V_{28}$ = the voltage at node 28,
$V_D$ = the forward voltage across diode 29,
$V_{LBD}$ = the low level output of buffer driver 32. At the initiation of $t_2$, digital input data at terminal 22 goes high, monostable multivibrator 31 generates a pulse and the output of buffer driver 32 goes to a high voltage level. Voltage $V_{28}$ increases, diode 29 shuts off, and current flows from buffer driver 32 through capacitor 33 to coil 27. At the initiation of $t_2$, $$V_{28} = V_{CC} - V_D - V_{LBD} + V_{HBD}$$

where
$V_{HBD}$ = the high level output of buffer driver 32.
An example of the voltage margin obtainable is illustrated by the following calculations:

for $V_{CC}$ = 5.0 volts,
$V_D$ = 0.7 volts,
$V_{LBD}$ = 0.3 volts, and
$V_{HBD} = V_{CC} - 0.3$ volts, then
$V_{28}$ = 8.7 volts.

In other words, a voltage margin of 3.7 volts is obtained for a $V_{CC}$ of 5 volts. Monostable multivibrator 31, buffer driver 32 and capacitor 33 provide additional current to node 28 and coil 27 that prevents transistors 23 and 24 from saturating.

By now it should be appreciated that there has been provided an improved magnetic write circuit that operates at low power supply voltages and that has low power consumption.

What is claimed is:

1. A circuit for writing on a magnetic medium, said circuit having a first and second supply voltage terminals and an input terminal for receiving a digital input signal having a first and a second state, said circuit comprising:
   first means coupled to said input terminal, including a coil magnetically coupled to said magnetic medium for providing magnetic pulses to said magnetic medium, and having a node coupled between said coil and said first supply voltage terminal; and
   second means coupled between said input terminal and said node for summing an additional voltage with said supply voltage substantially at the initiation of said first state of said input signal.

2. The circuit according to claim 1 wherein said second means comprises:
   a capacitor having a first terminal and a second terminal, said first terminal coupled to said node; and
   third means coupled between said input terminal and said second terminal for supplying a voltage to said capacitor.

3. The circuit according to claim 2 wherein said second means further comprises a diode coupled between said first supply voltage terminal and said node.

4. The circuit according to claim 2 wherein said third means comprises:
   a multivibrator coupled to said input terminal; and
   a buffer driver coupled between said multivibrator and said second terminal of said capacitor.

5. The circuit according to claim 3 wherein said magnetic pulse means comprises:
   a flip-flop coupled to said input terminal and having a first and a second complementary outputs;
   a differentially connected pair of transistors having said coil coupled between their collectors, their bases coupled to said first and said second complementary outputs, respectively, and their emitters coupled to said second voltage supply.

6. An improved circuit for writing on a magnetic medium, said circuit having an input terminal for receiving a digital input signal; a coil magnetically coupled to said magnetic medium and having a midpoint coupled to a first supply voltage terminal; a pair of differentially connected transistors having said coil coupled between their collectors, and having their emitters coupled to a second supply voltage terminal; a flip-flop having an input coupled to said input terminal, a first output coupled to a base of one of said transistors, and a second output coupled to a base of the other transistor, said first output having a complimentary state of said second output; wherein the improvement comprises first means coupled between said input terminal and said midpoint of said coil for summing an additional voltage with said supply voltage at a predetermined portion of said digital input signal.

7. The circuit according to claim 6 wherein said summing means comprises:
   a diode coupled between said first supply voltage terminal and said midpoint of said coil;
   a capacitor having a first terminal and a second terminal, said first terminal coupled to said midpoint of said coil; and
   second means coupled between said second terminal of said capacitor and said input terminal for supplying a voltage to said capacitor.

8. The circuit according to claim 7 wherein said second means comprises:
   a buffer driver coupled to said capacitor; and
   a multivibrator coupled between said input terminal and said buffer driver.

* * * * *